United States Patent [19]
Strubbe

[11] 3,797,208
[45] Mar. 19, 1974

[54] MECHANISM FOR THE AUTOMATIC STEERING OF AGRICULTURAL MACHINES, ESPECIALLY COMBINES
[75] Inventor: Gilbert J. Strubbe, Zedelgem, Belgium
[73] Assignee: Clayson N.V., Zedelgem, Belgium
[22] Filed: Oct. 21, 1971
[21] Appl. No.: 191,303

[30] Foreign Application Priority Data
Oct. 23, 1970  Belgium .................................. 50546

[52] U.S. Cl. ................................................. 56/10.2
[51] Int. Cl. ............................................... A01d 35/02
[58] Field of Search ........ 56/10.2, DIG.15; 180/79.1

[56] References Cited
UNITED STATES PATENTS
3,425,197  2/1969  Kita ............................... 56/DIG. 15
2,981,355  4/1961  Rabuse ......................... 56/DIG. 15
3,550,362  12/1970  Graeber ....................... 56/DIG. 15

Primary Examiner—Louis G. Mancene
Assistant Examiner—J. A. Oliff
Attorney, Agent, or Firm—Frank A. Seemer; John R. Flanagan; Joseph A. Brown

[57] ABSTRACT

A mechanism for the automatic steering of agricultural machines, especially combines, comprising a first electrical transducer operatively coupled to an element of the crop edge sensor, a second electrical transducer coupled to a moveable element of the steering means, an electric motor which acts on the steering means, and an electronic reversing means which switches said electric motor such that the position of the aforesaid second transducer is brought into agreement with the position of the aforesaid first transducer.

12 Claims, 12 Drawing Figures

MECHANISM FOR THE AUTOMATIC STEERING OF AGRICULTURAL MACHINES, ESPECIALLY COMBINES

BACKGROUND OF THE INVENTION

The present invention deals with a mechanism for the automatic steering of agricultural machines, especially combines, by which it is the intention to omit the manual steering of an agricultural machine at certain moments and thus steer the machine automatically in order to enable the driver to better check the machine function and to let him carry out the adjustments which may be necessary from time to time.

Automatic steering mechanisms for agricultural machines are known in the art, but such mechanisms basically comprise hydraulic components.

A great disadvantage of such a hydraulic operating automatic steering mechanism can be seen in the fact that because such a system operates hydraulically additional hydraulic components will be needed thereby complicating and increasing the cost of the hydraulic system of the combine or agricultural machine.

Other disadvantages of such a hydraulic system is that the normal hydraulic system of the agricultural machine is heavily loaded and that the entire hydraulic mechanism of the combine has to be adapted to such automatic steering.

It is an object of the present invention to provide an automatic steering mechanism for agricultural machines, by which all elements which are used for the manual steering of the machine are used and by which the additional elements are relatively inexpensive and can be mounted very easily on the existing machine without having to substantially modify the machine.

Other advantages of the automatic steering mechanism used with agricultural machines, especially combines, according to the invention are: a very precise operating and very stable automatic steering mechanism; an automatic control in the mechanism which corrects in an asymptotic manner each deviation from the required position; a very simple mechanism so that an existing machine can be provided with such mechanism without necessitating many changes; an inexpensive mechanism because elements of the mechanism are available on the market or can be manufactured in a very simple manner; an automatic mechanism which directly acts on the hydraulic steering valve and on the steering axle of the machine, so that a very simple change over from manual steering to automatic steering and vice versa is obtained; an automatic steering mechanism which can be interrupted and replaced at each moment by the traditional manual machine steering by which in a certain version, the manual steering always has priority over the automatic steering, so that the change over from automatic to manual steering and vice versa is again very simple; the output and efficiency of the machine increases because the driver can spend more time on the machine checking and making adjustments during its operation; the driver's comfort is exceedingly improved since he is relieved from much time consuming activity, thereby reducing the fatigue factor; all the parts of the steering means used with the manual steering are also used with the automatic steering so that the change over from automatic to manual steering becomes very simple, since each position of the steering wheels always corresponds with a certain position of the steering axle, independently of whether the machine is controlled automatically or manually; the electronic reversing switching means which is utilized in the automatic steering mechanism according to the invention is very simple; and the entire construction of the automatic steering mechanism is very light and its sensitivity and accuracy is very high.

The automatic steering mechanism of agricultural machines, especially combines, which shows the aforesaid and other advantages mainly consists in the combination of a first electrical transducer which is coupled to a movable element of the crop edge sensor, a second electrical transducer which is coupled to an element of the steering means, an electric motor which influences the steering means, and also an electric means containing an electronic reversing switching means, which switches the electric motor in such a manner that the position of the aforesaid second electrical transducer is brought into correlation with the aforesaid first electrical transducer.

By an electrical transducer we mean a mechanical-electrical transducer which produces an electrical signal which the change of one of the characteristics of the transducer corresponds to a change in the positions of the movable elements coupled to said transducers.

Figure 1:
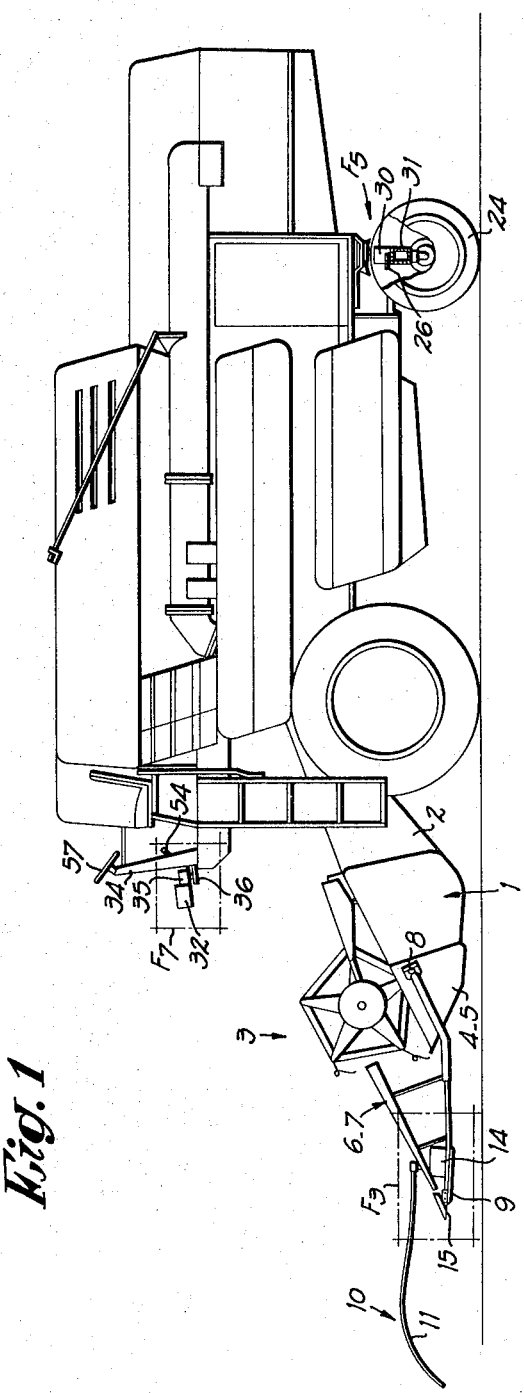
FIG. 1 shows a schematical side view of a combine on which the improvements are applied according to the present invention.
Figure 2:
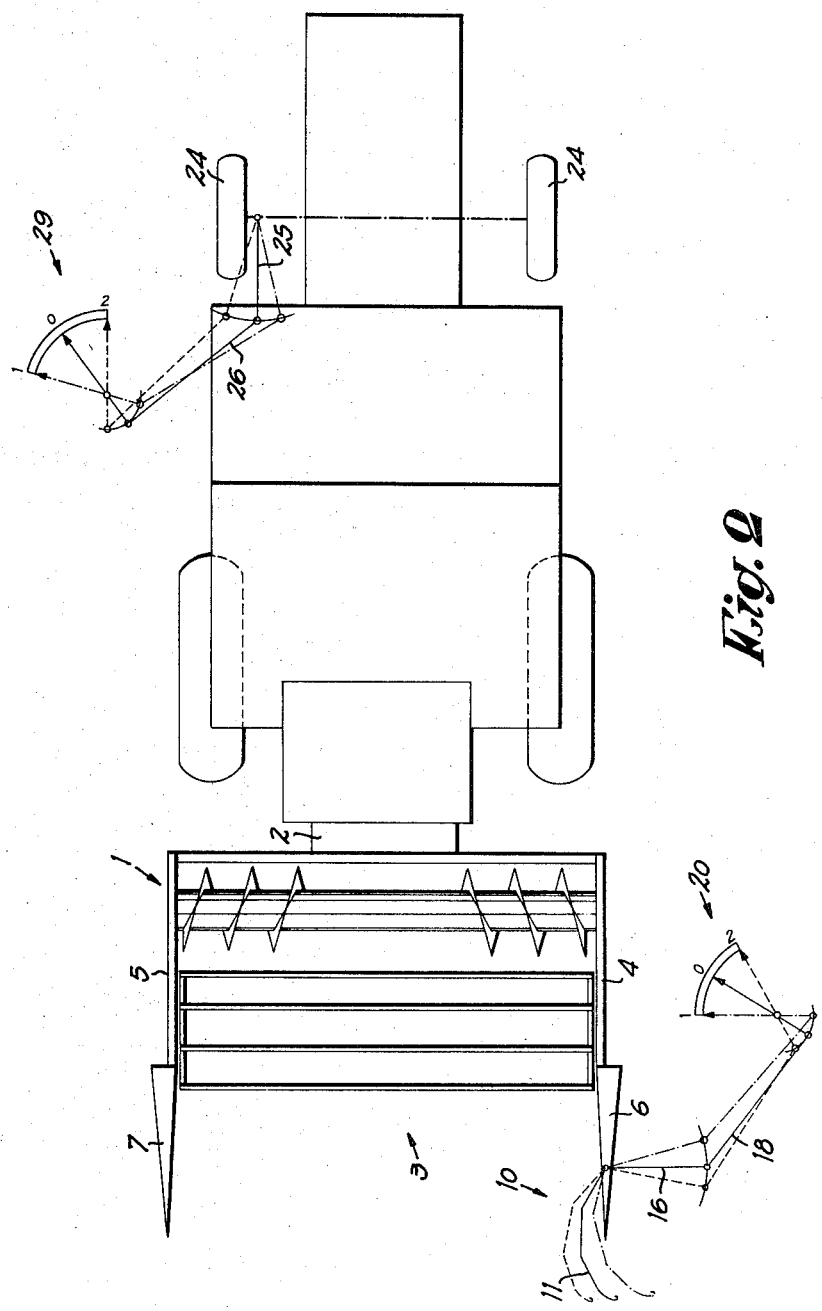
FIG. 2 is a schematic top view of a combine according to FIG. 1.
Figure 3:
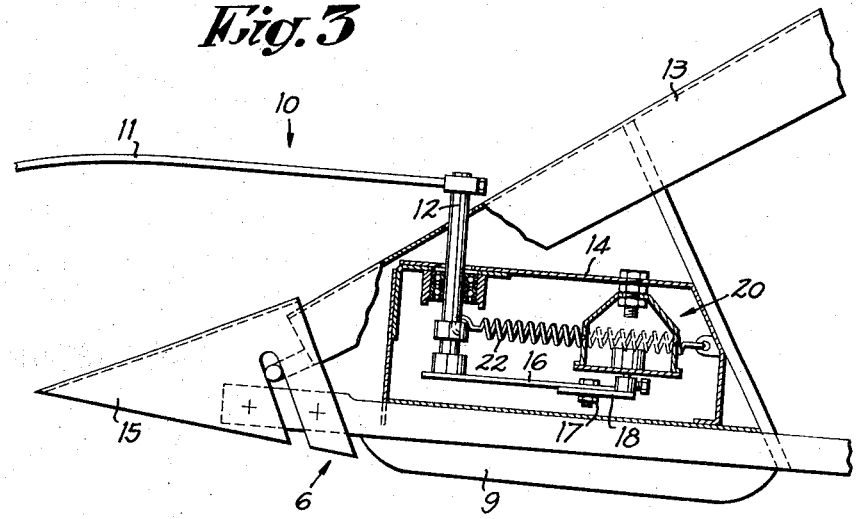
FIG. 3 shows on a larger scale the part which is indicated in FIG. 1 by F3.
Figure 4:
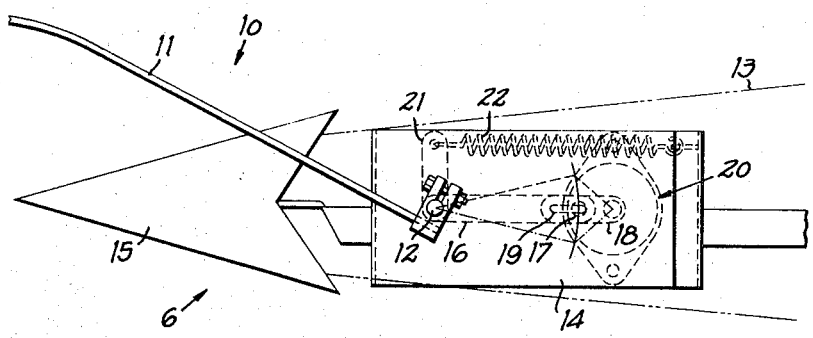
FIG. 4 shows a top view of FIG. 3.
Figure 5:
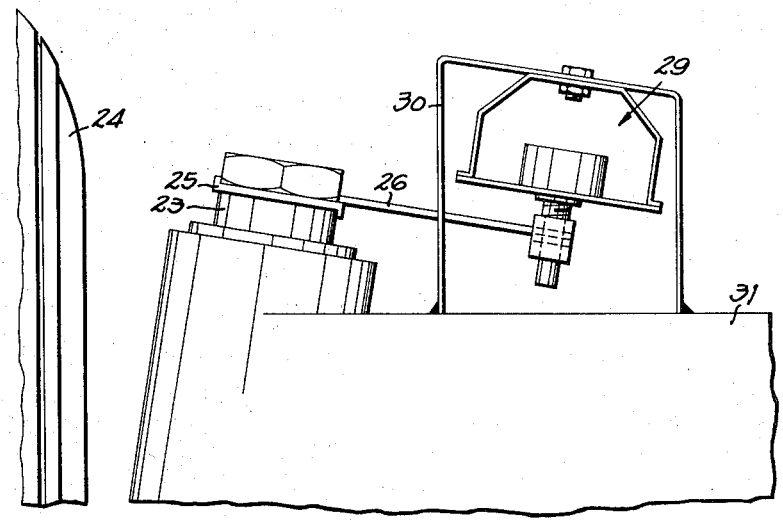
FIG. 5 is a partial view according to arrow F5 in FIG. 1.
Figure 6:
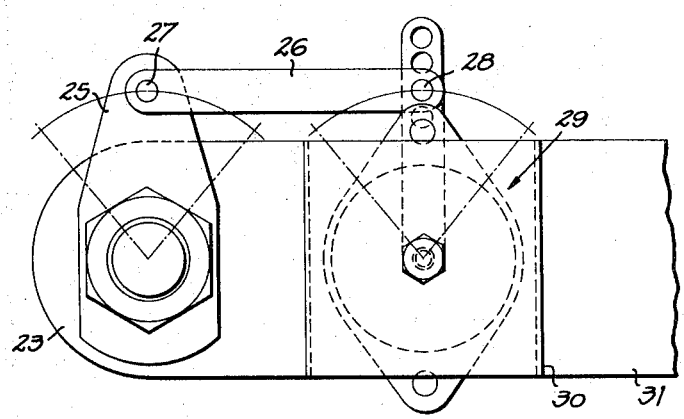
FIG. 6 is a top view of FIG. 5.
Figure 7:
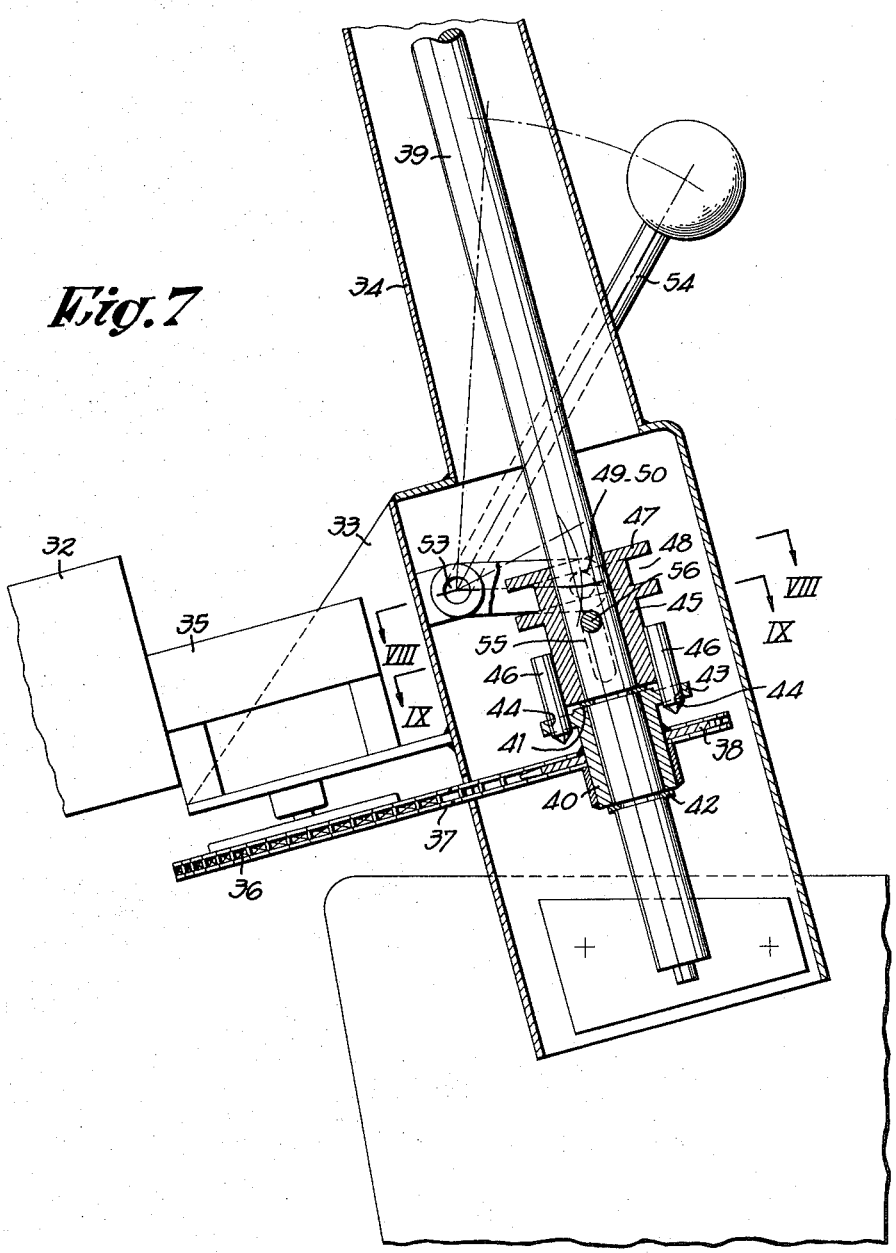
FIG. 7 shows on a larger scale and with portions cutaway the part indicated in FIG. 1 by F7.
Figure 8:
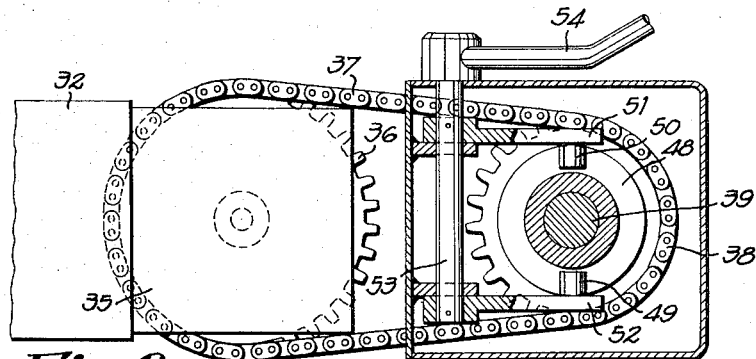
FIGS. 8 and 9 are respectively cross-sections taken along the lines VIII—VIII and IX—IX in FIG. 7.
Figure 9:
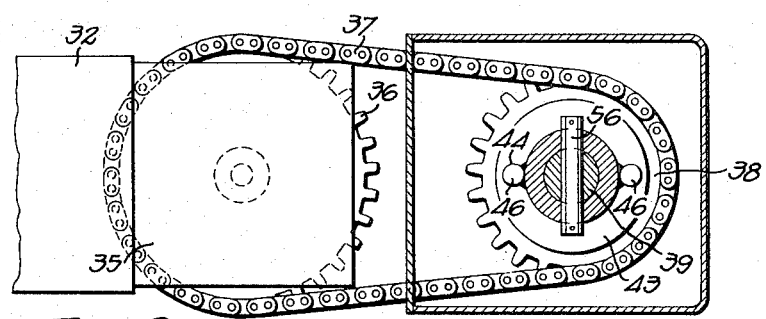

As known, a combine is always provided with a header 1 which itself is connected with a straw elevator 2, and which supports a so called pick-up reel 3. Via this header 1, which at the front side is provided with a so called cutting mechanism, the standing crop is cut and harvested.

Mainly, such a header comprises a frame having vertical side walls 4–5, on which is carried a pair of crop dividers 6–7 which are freely pivotally fixed at pivot point 8.

Such crop dividers extend in front of the header and slide over the ground via a plate 9 during the combine operation.

The crop dividers serve to guide the fallen crop stalks which have fallen out of the crop edge of the standing crop, in such a manner that they completely land in the header. In case the aforesaid crop dividers 6–7 are not applied on the combine, then the aforesaid side plates 4–5 of the header serve as dividers. In the embodiments of the invention described hereafter and shown in the attached figures, a combine is chosen which is provided with crop dividers 6–7.

Naturally, in case such crop dividers 6–7 are not provided, the mechanism according to the invention will be applied on one of the aforesaid side walls 4–5 of the header.

A crop edge sensor 10 is mounted on one of the crop dividers 6–7 in this case the divider which normally moves next to the edge of the standing crops, usually the left divider. This detector mainly consists of a feeler member 11 which projects forwards and of which the shape is carefully chosen as shown in FIGS. 1–4. The feeler member 11 is connected with shaft 12 which passes through the top element 13 of the concerned crop divider. This shaft 12 is supported in a housing 14 fixed on the crop divider underneath the top part of the crop divider 13 and positioned as close as possible to its top 15.

On the aforesaid shaft 12, an arm or rod 16 is secured which is pivotally connected via a spindle 17, with an arm or rod 18. In order to make an angular displacement possible between both arms 16 and 18, the aforesaid spindle 17 passes through a groove 19 which is provided for this purpose in one of the aforesaid arms 16 or 18.

Arm 18 is connected with the shaft to an electrical transducer for example a potentiometer 20 which is fixed in housing 14. In order to make a certain adjustment possible, potentiometer 20 is fixed in this housing in such a manner that it can be turned after making its fixation loose. Also likewise the length ratios of the aforesaid arms 16 and 18 will be chosen in a suitable manner or be made adjustable so as to make the magnitude of the shaft's angular displacement of the position indicator adjustable in function to the feeler's angular displacement.

Further, on shaft 12, a second extension or arm 21 is fixed which is connected at its free extreme end with a spring 22. This spring is fixed with its second extreme end to the housing 14. The aforesaid arm or projection 21 is applied in such a manner on shaft 12 that spring 22 always moves the arm 11 to the edge of the standing crops, in other words toward a maximum deflection of the potentiometer 20 in one direction.

According to the present invention, an extra arm 25 is fixed on the wheel spindle 23 of one of the steering wheels 24, of the combine. This extra arm is connected via a rod 26 and spindles 27 and 28 respectively with an arm which itself is connected with the shaft of a second electrical transducer, for example a potentiometer 29. Also this potentiometer 29 is fixed in such a manner with a support or the like 30, which itself is fixed on steering axle 31, so that it can be turned to obtain a certain adjustment after loosening its fixation means.

It is obvious that in this manner each steering wheels' 24 position corresponds with a certain position of the potentiometer 29.

The aforesaid potentiometers 20 and 29 form a part of an electric means which comprises an electronic reversing switching means and an electric circuit and a d.c. motor 32. The d.c. motor 32 is fixed to the front side of the driver's platform, as it is shown in FIG. 1. This for example, is obtained by means of a suitable support 33 which is secured on the steering column covering 34. The motor 32 is connected in a suitable manner with the steering column 39 via a reduction gearbox 35, the latter connection preferably being formed by a worm and worm wheel, via a sprocket 36, and a chain and a sprocket 38. For this purpose in this execution, the aforesaid sprocket 38 is fixed on a bushing 40 which is freely rotatably applied on the steering shaft 39 and of which the axial displacement, with regard to the steering shaft, is hindered for instance by means of suitable rings 41–42. Bushing 40 is provided with a collar 43 in which two or more bores 44 are applied.

On top of the aforesaid bushing 40 a second bushing 45 is provided around the steering shaft 39. This bushing externally bears two or more pins 46 which can cooperate with the bores 44 of bushing 40. The top extreme of bushing 45 is provided with a collar 47 in which a circumferential groove 48 is provided. Two diametrically opposite pins respectively 49–50 cooperate with this groove 48. These pins are connected with arms, respectively 51–52 which are fixed on a common shaft 53. This shaft is bearing in a suitable manner in supports provided for this purpose on the inner wall of the steering column covering 34 and projects sidewards out of this column covering and is provided on that location with lever 54 which is a hand grip and is placed in this manner in the vicinity of the combine driver. The aforesaid hand grip can be replaced by a pedal. Also two grooves 55 diametrically opposite each other are foreseen in bushing 45, through which a spindle 56 is applied which is connected in a suitable manner with steering shaft 39.

One operates this mechanism by displacing lever 54, which displaces pins 46 so that the bushings 40 and 45 can be connected with each other or disconnected so as to allow either the electrical motor 32 to control the steering shaft 39, or the steering shaft 39 be controlled manually.

The lower extreme of the aforesaid steering shaft 39 is traditionally connected with the master valve of the hydraulic system provided on the combine. Such a valve is well-known in the art. With the manual as well as with the automatic steering mechanism, this valve will adjusts the oil supply to the steering cylinder which governs the wheels 24.

Figure 10:
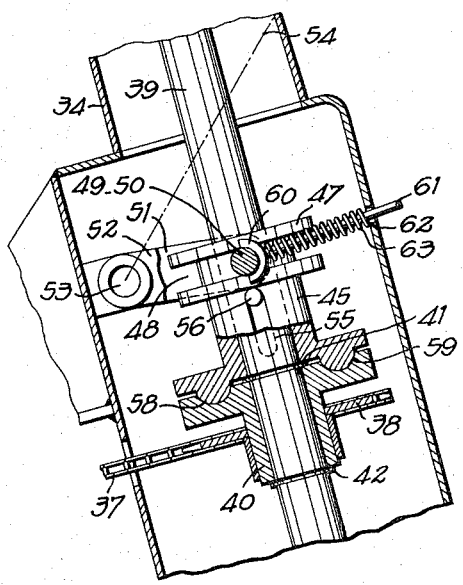
FIG. 10 shows a variant of the execution as shown in FIG. 7.

In FIG. 10, an alternative design is shown for connecting the aforesaid motor 32 with the steering shaft 39. This execution is designed such that the automatic steering is automatically eliminated when steering wheel 57 is turned manually. For this purpose, the aforesaid bushing 40 is provided at its top edge with two recesses 58 with which projections 59 cooperate therewith.

A claw or jaw 60 which is connected with a rod 61 and which itself passes through a bore 62 in the cooperating steering column's wall is provided for acting on each of the aforesaid pins 49–50. Between each jaw 60 and the steering column's inner wall a spring 63 is applied. The aforesaid opening 62 is placed in such a manner that it is situated slightly above the lowest position of pins 49 and 50 when bushings 40 and 45 are connected with each other. Springs 63 press in this manner the aforesaid projections 59 into the recesses 58. This pressure is adequate enough to maintain the clutch and thus turn the steering shaft 39 also when bushing 40 is turned by motor 32.

In this execution, when the steering shaft 39 is manually turned by means of steering wheel 57, the worm wheel reduction 35 between motor 32 and clutch 58-59 will offer a resistance by which bushing 45 is pushed upwards because the projections 59, due to their size, are moved out of the recesses 58. Through this, bushing 45 is also pushed upwards and this over such a height that the center line of pins 49–50 is placed above the aforesaid bore 62 by which the unclutched position of bushings 40 and 45 is reached and maintained automatically.

In this way, one obtains a steering mechanism by which the manual steering of the machine always has priority over the automatic steering mechanism. In case the manual steering has to be eliminated, and it is switched over to automatic steering, the aforesaid lever or pedal 54 will be turned down so that bushings 40 and 45 will be connected with each other again.

Figure 11:
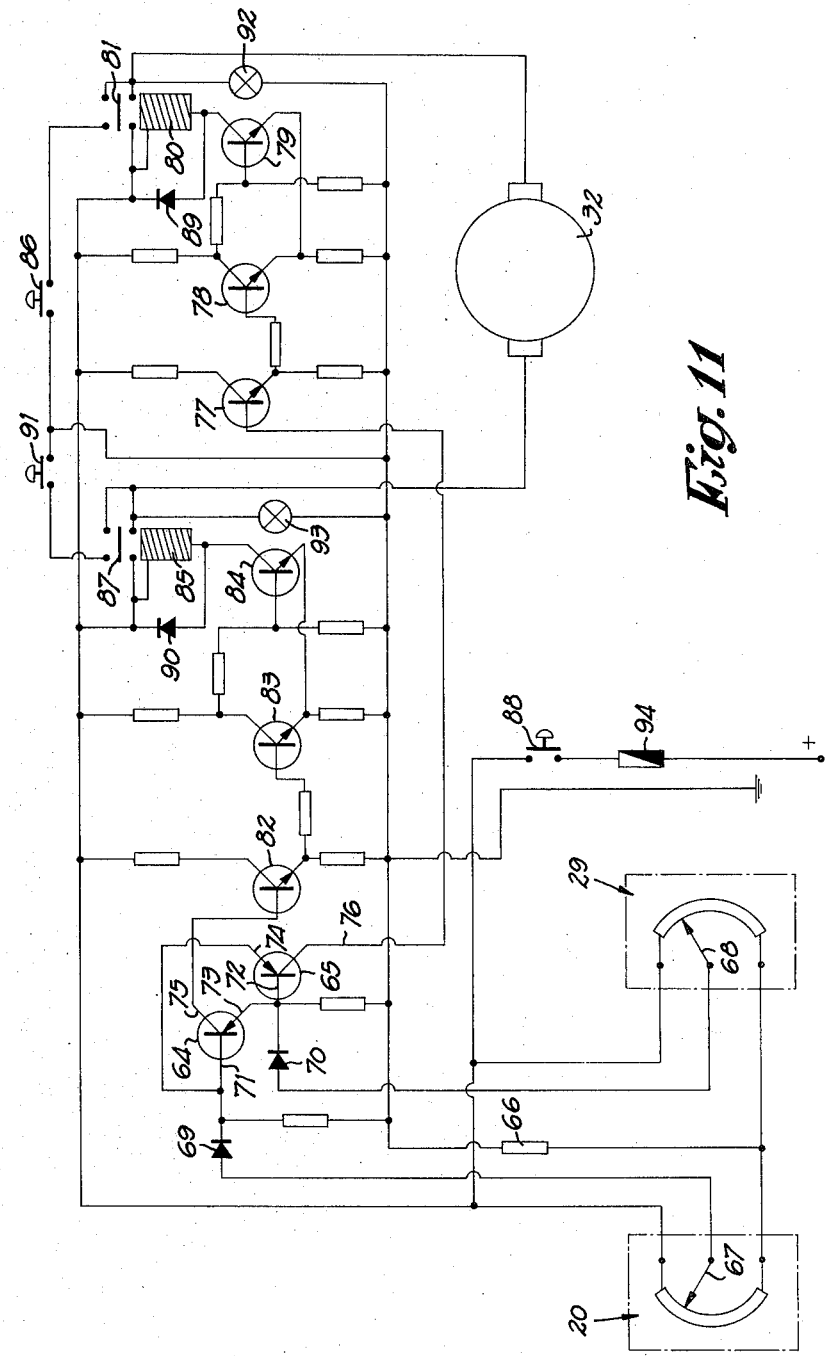
FIG. 11 shows an electrical amplifying circuit for the automatic steering mechanism according to the invention.

The electric means of the mechanism as shown in FIG. 11 contains a plurality of symmetrical unidirectional circuits, having lead-in and output circuits the lead-in circuit having a first step comprising two transistors 64 and 65. The potentiometers 20 and 29 are directly connected at one of their sides with the positive pole and at their other side via a common adjustable series regulator 66 with the negative pole of the feed battery. The sliding contacts 67–68 of these potentiometers respectively 20 and 29 are directly connected via diodes respectively 69 and 70 with the base electrodes respectively 71 and 72 and inversely with the emission electrodes respectively 73 and 74 of the aforesaid transistors 64–65, of which the collectors 75 and 76 are each connected with an output circuit.

The output circuit of transistor 65 connects the collector 76 with the input of an undirectional amplifier circuit which consists of three transistors 77–78–79, the first transistor is engaged as an emission collector amplifier; the second transistor 78, and a last transistor 79 wherein the collector load is formed by a solenoid with a relay 80, the latter controls by means of its contact 81, the excitation of the motor 32 so as to make it rotate in one or another direction.

The output circuit of transistor 64 connects collector 75 with the input of an amplifier, which likewise includes three transistors 82,83,84 engaged exactly in the same manner and operates as the amplifier 77,78,79 mentioned above, in which, the collector load of transistor 84 is formed by a solenoid of a second relay 85 which influences in a similar manner the excitation circuit of motor 32.

This electric means operates as follows: if the moveable arms of the potentiometers 20–29 take the same position, then there does not exist a potential difference between the sliding contacts 67 and 68, and the base electrodes 71–72 as well as the emission electrodes 73 and 74 of the transistors 64–65 are situated at equal potentials. None of the transistors conduct and the output circuits 75–76 remain dead.

In case however the crop edge senser 10 moves to one or another side under the influence of a change in position of the combine with regard to the crop edge, the sliding contacts 67–68 will show a potential difference. Take for instance the situation when contact's 67 potential lies higher than that of contact 68, the transistor 65 will then become conductive in case the potential difference exceeds a certain threshold value, since the emission electrode 74 will be sufficiently positive with regard to base 72. As a consequence, current flows in one output circuits 76, while the other output circuits remain dead. Through this, transistor 77 also became conductive by which the potential on the basis of transistor 78 becomes higher than the emission electrode; so that this transistor becomes conductive in such a manner that the last transistor 79 is cut off and solenoid 80 in the collector circuit of this transistor becomes dead.

The ratios in the other amplifier (transistors 82-83-84) are just inversed, i.e., transistors 82 and 83 do not conduct, so that transistor 84 draws current through solenoid 85 which thus becomes energized.

In this position, the right hand terminal of the motor, is connected with the negative battery pole via contact 81 which is in a rest condition and the normally closed contact 86. The left hand terminal of motor 32 is connected with the positive battery pole via contact 87, which is energized by the normally closed contact 88.

It is obvious that when inverted, the sliding contact 68 of potentiometer 29 becomes more positive than the sliding contact 67 of potentiometer 20, solenoid 80 is energized and solenoid 85 is dead by which the motor is energized in an opposite direction.

If the motor is energized in one or another direction, then it acts on the steering axle by way of the master valve, and adjusts the oil supply and discharge to and from the traditional steering cylinder in such a manner that the combine is moved with regard to the crop edge to its exact position and thus likewise the deviation between the position of both position indicators is decreased and finally brought back to zero. As soon as this happens, the relay solenoids 80 and 85 are again dead so that the energizing of the motor is broken.

To obtain a stable system, it is necessary that the correcting operation stops before the position of the combine changes in such a manner that the feeler requires a new opposite correction, the transistors 64 and 65 have to be chosen and adjusted in such a manner so that the threshold value is just great enough. If this is too small, the mechanism then shows an inclination for overcompensation which results in oscillation. The stability can also be influenced by charging the length of the feeler elements by which a greater stability is obtained with a longer feeler element.

If the series regulator 66 is made adjustable, then one can also adjust with this the voltage drop per unit angular displacement of the potentiometers, and thus also effect the sensitivity of the mechanism, by which the dead margin, i.e., the crop edge sensor's displacement, whereby the system does not yet react.

The diodes 69–70 prevent the flowing of current from the transistors to the potentiometers. Diodes 89 and 90 serve as a protection of transistors 79 and 84 against the induction voltages which occur through the disconnection of solenoid 80, respectively 85. Switches 86 and 90 are end circuit breakers which interrupt the energization of motor 32 at the moment that the steering wheels have reached their maximum deviation, since otherwise one or more parts of the steering means would be damaged in certain executions of the steering means.

Moreover, warning lights 92–93 are provided in the mechanism which additionally indicate in which manner the automatic steering mechanism is directed and which are applied for this purpose on the control panel. A safety-fuse 94 protects the electric means against short circuits. Switch 88 permits the engagement or disengagement of the electrical system.

A number of circuit breakers in series with the main switch 88 can also be applied which interrupt the electrical circuits in case other parts of the combine are not in operation.

Indeed for preference the described electrical circuit must be interrupted when, the header is raised upwards, when the header drive is disengaged, when the threshing mechanism is disengaged, when the combine drives backwards and when the motor contact is not on.

A circuit breaker in series with switch 88 can be applied for each of these conditions. A similar circuit breaker can also be connected with handle 54 by which the electrical circuits can be interrupted, respectively when the automatic steering is engaged.

It is obvious that the electronical parts may be provided in a black-box such that the influence of dust and moisture is excluded.

The aforesaid solenoids can also be replaced by switching transistors.

The mechanism obtained in this manner is very cheap. Indeed all elements, such as crop edge sensor, transducers, electric means and electric motor, are obtainable on the market or can be made in a very easily.

The feeler element of the crop edge sensor, in the preferred execution consists of a light tube, preferably of aluminum, which is bent. Indeed the element must be as light as possible so that no deviations through its own weight are obtained for example when the combine is operating on hill-side conditions.

It should be noted that the mechanism according to the invention uses the existing traditional steering elements such as master valve, steering cylinder and hydraulic pipes, without having to provide extra hydraulic components.

A great advantage one obtains in this manner is that the automatic drive can be presented as optional equipment to the client, since nothing has to be changed to the existing mechanism and only a small number of elements have to be mounted additionally, which can be carried out very easily and cheaply.

Figure 12:
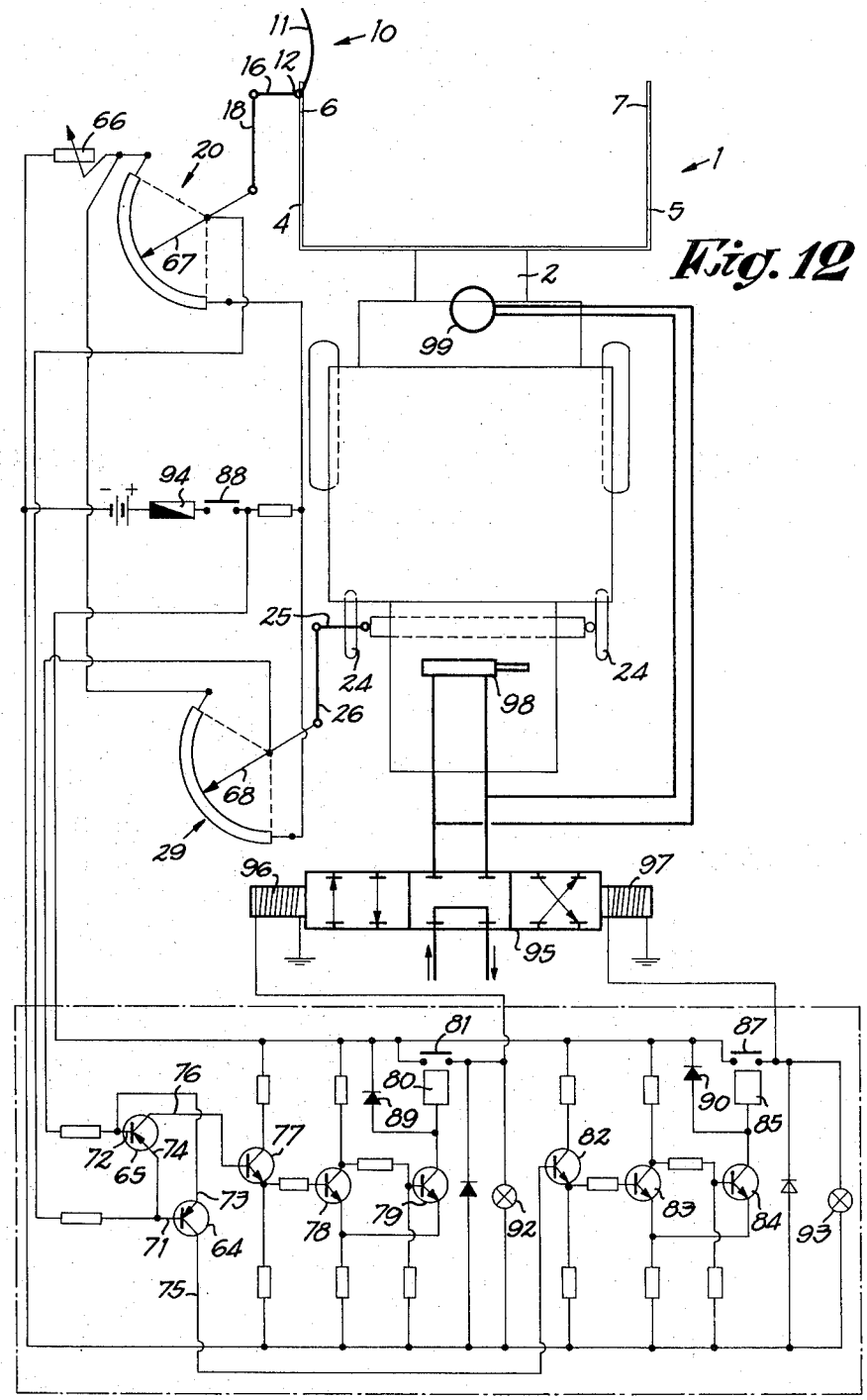
FIG. 12 shows a scheme of an alternative design.

In an alternative preferred embodiment, see FIG. 12, one could replace the electric motor 32 by a hydro-electrical valve 95. Relay 80,85, respectively connects an energization thereof solenoid 96, and 97, respectively, to an electric source, by which the valve 95 is switched as such so that the steering cylinder 98 is controlled. In this case, the master valve 99 is parallel with the aforesaid valve 95 with regard to the steering cylinder so that the manual drive is possible at each moment. Since the steering wheel 56 does not rotate at the same time (responsive to the automatic steering) in this execution, when the automatic steering mechanism is operating, one has to use a known master valve having no limits in order to make the execution practically realizable.

Naturally it is a fact that the present invention is not at all limited to the executions described as an example and shown in the enclosed figures.

It is for example obvious that the aforesaid mechano-electric transducers, particularly, the potentiometers 20–29 can be replaced by capacitive, inductive or piezo electric elements giving similar output signals in combination with other electrical switches.

Having thus described my invention, what I claim is:

1. In an agricultural harvesting machine adapted to be propelled over the ground capable of contacting standing crops, and with means to steer said machine, said machine having an automatic steering mechanism comprising a crop edge sensor operatively interconnected to an element that moves over a range of positions relative to the movement of the crop sensor, said sensor being operative to sense and to continuously engage the crop edge, a first electrical transducer coupled to the movable element of the crop sensor, a second electrical transducer coupled to an element of the steering means, said element being operatively interconnected to said steering means so as to allow the element to move through a range of positions in respect to the movement of the steering means, both of said electrical transducers being arranged so as to have an electric output signal which represents the position of the respective movable element to which they are interconnected, an electric means for comparing both output signals with each other and to energize an electric motor which is coupled to the steering means so as to control said steering means by attempting to balance the output signals of the electric transducers during operation of the machine.

2. An agricultural machine as set forth in claim 1 wherein said electric means comprises an electronic circuit for comparing the respective electric signals of the transducers and amplifying the excess unbalanced portion of the electric signals compared in said circuit, an electronic reversing switching means which receives said output signal and which, responsive to said amplified output signal closes the feed lines of the electric motor so as to energize the motor in one particular direction in an attempt to offset the resulting output signal and thereby balance the potential difference created in the electric circuit by said electric transducers.

3. An agricultural harvesting machine as set forth in claim 2 wherein said first and second electrical transducers consist of potentiometers for comparing and measuring the potential difference that is created upon movement of the respective movable elements associated with the crop edge sensor and the steering means.

4. An agricultural harvesting machine as set forth in claim 3 wherein said respective potentiometers are connected to a direct current source, said potentiometers also having sliding contacts which are connected to the movable elements of both the crop edge sensor and the steering means so that said contacts move in relation to the movement of the crop edge sensor and the steering means to create a particular potential difference in the respective potentiometers.

5. In an agricultural machine as set forth in claim 2 wherein said electronic reversing switching means comprises a plurality of solenoids connected to the end of the amplification portion of the electronic circuit, and relays operatively connected to said solenoids and the electric motor for closing the respective feed line of said motor thereby controling the excitation of the motor so that the motor will operate in such a manner as to offset the resulting output signal and thereby attempt to balance the potential differences as measured by said potentiometers.

6. An agricultural harvesting machine as set forth in claim 2 wherein said electronic circuit comprises at least two lead-in circuits for comparing the resulting potential differences as measured by the respective potentiometers, and which further porvides the difference in potential to be transmitted to the output circuit as an output signal, and at least two output circuits which act as unidirectional amplifier circuits which amplify said output signal prior to its entering the electronic reversing switching means.

7. An agricultural harvesting machine as set forth in claim 6 wherein said lead-in circuits comprises a plurality of diodes placed between the respective potentiometers and their base electrodes, emission electrodes inversely connected to said potentiometers, a plurality of transistors connected to said base electrodes and which have collectors running from said transistors to the output circuit.

8. An agricultural harvesting machine as set forth in claim 6 wherein said output circuits comprises a plurality of transistors connected in series to each other and which are connected to the collector of the lead-in circuit to collect the output signal emitted from the lead-in circuit and amplifying said signal in steps as it passes through the series connected transistors so that upon reaching the last transistor of said circuit the signal will activate the solenoids and the relays connected with the electronic reversing switching means to excite the electric motor.

9. An agricultural harvesting machine as set forth in claim 6 wherein the output circuits comprise tripping means interconnected to said output circuits for interrupting operation of the output circuit when header is raised, header drive is disengaged, threshing mechanism is disengaged, the harvesting machine is driven backwards, or when steering wheels reach their maximum deviation.

10. An agricultural harvesting machine as set forth in claim 1 wherein said steering means comprises a steering structure operatively interconnected with said steering means for either manually or automatically controling said steering means so that movement of the steering structure will impart a resulting movement to the steering means thereby allowing the operator to control the direction of travel of the machine either manually or automatically.

11. An agricultural harvesting machine as set forth in claim 10 wherein said steering mechanism comprises a rotatable shaft mounted in a steering column positioned and fixed to the floor of the operator's platform of the harvesting machine, a steering wheel mounted on the upper end of said rotatable shaft to enable the operator to manually rotate the shaft, an upper bushing rigidly fixed to said rotatable shaft and positioned within said steering column said bushing further containing a plurality of pins which can be raised or lowered by the activation of a displacing lever, the outer end of said lever extending through and projecting from the steering column while the inner end of the lever is pivotally connected to a support mounted within said steering column said support also containing arms which have one end interconnected to said lever while the other end is connected to said pins so that the movement of the lever will pivot its end support mounted in the steering column thereby moving the arms which are interconnected both to said lever at the support and to the pins of the upper bushing said movement of the lever ultimately either raising or lowering the pins contained in the upper bushing depending on the motion imparted initially to said lever, a lower freely rotatable bushing placed on said shaft below said upper bushing the lower bushing being restrained from axial movement by rings placed above and below said lower bushing, said lower bushing also comprising an upper collar said collar provided with a plurality of bores capable of receiving the pins associated with the upper bushing, the lower bushing being interconnected with the electric motor by a connecting means so that during operation of the motor the lower bushing can freely rotate about said steering shaft without imparting any rotation to the steering shaft so that the operator can manually rotate said shaft without interference but if the operator wishes to engage the automatic steering mechanism he needs simply move the displacing lever which protrudes from the steering column to engage the plurality of pins positioned in the upper bushing which is fixed to said steering shaft and thereby lower said pins into the rotatable lower bushing bores so that movement of the lower bushing generated and controlled by the electric motor of the automatic steering mechanism through the connecting means can be imparted to the rotatable steering shaft through said rigidly mounted upper bushing.

12. An agricultural harvesting machine as set forth in claim 11 wherein said connecting means comprises a reduction gearbox having one end connected to said electric motor, said gearbox containing a worm and a worm wheel connected to a rotatable sprocket, a rotatable rigidly fixed on the freely rotatable lower bushing, said sprockets being interconnected by an endless chain mounted on said sprockets.

* * * * *

UNITED STATES PATENT OFFICE
CERTIFICATE OF CORRECTION

Patent No. 3,797,208        Dated March 19, 1974

Inventor(s) Gilbert J. Strubbe

It is certified that error appears in the above-identified patent and that said Letters Patent are hereby corrected as shown below:

Claim 3, delete "Claim 2" and insert therefor --Claim 1--

Signed and sealed this 16th day of July 1974.

(SEAL)
Attest:

McCOY M. GIBSON, JR.        C. MARSHALL DANN
Attesting Officer            Commissioner of Patents